(12) United States Patent
Moir et al.

(10) Patent No.: US 9,392,409 B2
(45) Date of Patent: Jul. 12, 2016

(54) METHOD AND SYSTEM FOR WIRELESS LOCAL AREA NETWORK PROXIMITY RECOGNITION

(71) Applicants: Kirk Arnold Moir, New Westminster (CA); James Francis Hallett, Vancouver (CA)

(72) Inventors: Kirk Arnold Moir, New Westminster (CA); James Francis Hallett, Vancouver (CA)

(73) Assignee: Locality Systems Inc., New Westminster (CA)

( * ) Notice: Subject to any disclaimer, the term of this patent is extended or adjusted under 35 U.S.C. 154(b) by 34 days.

(21) Appl. No.: 14/104,417

(22) Filed: Dec. 12, 2013

(65) Prior Publication Data

US 2014/0169352 A1 Jun. 19, 2014

Related U.S. Application Data

(60) Provisional application No. 61/737,097, filed on Dec. 13, 2012.

(51) Int. Cl.
*H04W 4/02* (2009.01)

(52) U.S. Cl.
CPC .................................... *H04W 4/023* (2013.01)

(58) Field of Classification Search
None
See application file for complete search history.

(56) References Cited

U.S. PATENT DOCUMENTS

| 6,414,635 | B1 * | 7/2002 | Stewart et al. ................ 342/457 |
| 2003/0220835 | A1 * | 11/2003 | Barnes, Jr. ..................... 705/14 |
| 2008/0004888 | A1 * | 1/2008 | Davis et al. ....................... 705/1 |
| 2011/0029359 | A1 * | 2/2011 | Roeding et al. .............. 705/14.1 |
| 2011/0136506 | A1 * | 6/2011 | Stewart ...................... 455/456.1 |
| 2013/0231151 | A1 * | 9/2013 | Kneckt ............... H04W 40/246 455/515 |
| 2013/0343364 | A1 * | 12/2013 | Fuller .......................... 370/338 |

* cited by examiner

*Primary Examiner* — Kenny Lin

(57) ABSTRACT

A method and system for proximity detection, recognition and classification of a wireless local area network (WLAN) enabled device without a WLAN infrastructure. The proximity recognition system monitors WLAN communications at one or more known locations. The proximity of a WLAN device (transmitter) is sensed by examining signal strength received therefrom as the device engages in a sequence of protocol data unit exchanges seeking WLAN association.

14 Claims, 8 Drawing Sheets

METHOD AND SYSTEM FOR WIRELESS LOCAL AREA NETWORK PROXIMITY RECOGNITION

CROSS-REFERENCES TO RELATED APPLICATIONS

This application claims priority from Provisional U.S. patent application Ser. No. 61/737,097, filed Dec. 13, 2012, the disclosure of which is incorporated herein in its entirety by reference for all purposes.

BACKGROUND OF INVENTION

1. Field of Invention

The present invention relates to proximity detection and recognition of WLAN and related enabled mobile devices.

2. Description of Related Art

Understanding visitor behavior is critical to the design and optimization of retail and public spaces. Visitor behavior information is valuable to both owner/operator/provider of the space, venue or real estate as well as the merchants that may be operating businesses in space or venue provided by the real estate provider.

Adoption of mobile devices including mobile phones, smart phones, and tablets has enabled new means of allowing consumers to interact with merchants. Consumers can announce their presence as well as their interest in specific offers from the merchants they are visiting or are considering visiting. Merchants can also use mobile devices to better understand customer behavior and better incent customers.

Mobile devices are typically aware of their location thanks to technologies such as the global positioning system (GPS) and can provide this information to both software applications as well as the mobile communication network itself. GPS requires the mobile device to have a clear view of the sky in order to receive positioning information from multiple GPS satellites which are typically deployed above the equator in geosynchronous orbit. Because of this, GPS does not work well indoors or in outdoor locations that have obscured access to the portion of the sky where GPS satellites appear. This includes outdoor locations with tall buildings or other large infrastructure such as bridges (referred to as "urban canyons") and areas with dense foliage.

Mobile communications networks also have extensive positioning capabilities. Terrestrial based mobile communications network deploy a large number of base stations. The design of mobile communications networks has the mobile device stay in constant association with one or more base stations. As a result, the mobile communications network has information about the macro location of a mobile device. The range of a base station can be several miles in diameter and accurate positioning is made difficult due to signal strength fluctuations and other technical challenges.

Newer systems such as "Assisted GPS" are designed to combine information from GPS and mobile communications networks to improve accuracy. These systems also suffer from accuracy problems when GPS coverage is lost for extended periods of time.

Alternatives to satellite based location systems are emerging. One such example involves frequently sensing and recording the identification (typically by MAC address) and the signal strength of all the 802.11 based WiFi access points at a specific location. This recording is typically performed with a specially designed vehicle. When a mobile device needs to know its position, the mobile device itself can sense all the 802.11 access points in its vicinity and compare this with the previously recorded information to determine its location. This approach is effective in urban locations where GPS does not perform well. Increased AP density and frequent recording increase the accuracy of this type of system. These kinds of systems also operate independently of the mobile communications network. Once location is determined at the mobile device, it can be used by software applications on the mobile device to, for example, display location on a map background or it can be reported to a central server via the Internet.

A key consideration for merchants is the enablement and measurement of loyalty. Various techniques and technologies exist to perform this function. In order to attract customers and transaction traffic, merchants offer various transaction based incentive programs either developed internally or offered by a related third party provider. These incentive programs typically provide some credits or points which are provided proportionally to the size of the transaction. Some incentive programs may provide time limited programs where more points are assigned for purchasing a certain kind of good or service or purchasing at a certain class of merchant. Wide varieties of other incentive schemes exist or are possible.

Various systems exist to furnish information to merchants related to visitor behavior in retail and public spaces. These include thermal cameras, stereoscopic video cameras, and infrared light beams as well as other more application specific technologies such as road induction loops.

Such systems lack the ability to accurately detect and report on behavior of visitors between visits to a venue. This is an active area of innovation. Innovations in camera technology including facial recognition are being actively pursued by several parties.

To improve real estate provider and merchant understanding of the visitors to their premises, an improved system would be useful for enabling better understanding of the behavior of customers including visit frequency and visit duration with mobile devices.

One solution is to provide a system for receiving information transmitted by mobile devices in unlicensed spectrum and inferring behavior from this information including overall arrival rate, average length of visit, average frequency of visit, and, where possible, cross reference with loyalty related information.

SUMMARY OF THE INVENTION

The present invention integrates proximity recognition of mobile devices with customer behavior analytics.

Customer behavior is an important indicator of how successfully a company's marketing, branding, advertising as well as store formatting and arrangement are at bringing people into the actual merchant venue. Depending on the type of retailer, conversion rates from venue visits to actual purchases in the physical retail world are typically between 20-60%.

It is an object of the present invention to provide new and improved systems and process which preferably utilize technologies that enable merchants to better understand customer behavior. Customer behavior can be characterized in terms of both overall visitor statistics (such as unique visitors in a given time period such as an hour, day, or week) as well as additional measurements of behavior such as visit duration including related trending such as average customer visit, visitor return frequency and related trending, as well as visitor location and path taken within the venue. Customers can be classified for subsequent analysis. One example of this would be to classify customers according to their return frequency. Customer behavior can also be determined relative to specific time period at a venue when, for example, an event is held to determine, for example, absolute number and percent of visitors visiting the venue for the first time as well as the rate at which all visitors in a given category of visitors (such as first time visitors) return to the venue.

In accordance with the present invention, there is provided a system and process which enables a merchant operating in one or more venues to effectively understand the behavior of customer with WLAN enabled mobile devices.

Accordingly, one aspect of the present invention enables the merchant or real estate provider to become registered with the proximity recognition system through some online application process, some preexisting registration or sales fulfillment process including potentially preexisting offline processes or some combination of all of these possible process configurations.

Accordingly, the present invention involves one or more proximity recognition devices (or PRDs) operating at a merchant venue. Interactions between mobile devices and WLAN infrastructure are recorded by the proximity recognition device PRD, analyzed and sent to the central controller. Knowledge of interactions with mobile devices provides the proximity recognition system (PRS) with the ability to detect presence and specific location of the mobile device (i.e. its associated visitor) within the venue. As visitors move through the venue, the proximity recognition system (PRS) may emulate WLAN infrastructure of interest to the mobile device by prompting such interaction.

Accordingly, the present invention involves improvement of location accuracy. As location accuracy improves with the amount of interaction (between mobile devices and the system's PRD) to analyze, the PRD may optionally be tuned to prompt more or less interaction with the mobile device based on the objectives of the venue operator.

Accordingly, the present invention involves improvement of location accuracy through common trilateration techniques on interaction data received from three or more in venue receiver units.

Accordingly, the present invention involves analysis of the venue's current or future wireless local area network as, in some venues, such as sports venues, quality performance of the wireless local area network is becoming a required aspect of a customer's visit.

Accordingly, the present invention's central controller of the proximity recognition system (PRS), in one embodiment, is designed to run as an internet connected appliance providing a cloud based service. Alternative embodiments enable the central controller to be run by a merchant, a collection of merchants, or by a third party providing new or existing merchant analytics service including "footfall" analytics. When the customer enters a specific merchant venue, the system recognizes the event based on the detection of the customer's WLAN enabled mobile device. Customer behavior such as path taken through the venue and visit duration is reported to the central controller for appropriately anonymized analysis by the merchant's staff.

Accordingly, the present invention involves analysis by the central controller of information received from a plurality of proximity recognition devices PRDs deployed in venues connected to the central controller by a communications network such as the Internet. Results of this analysis are then transmitted to or available for display to the merchant or real estate provider at their request.

Accordingly, the present invention involves correlation with one or more loyalty incentive systems operated by the merchant or the real estate provider and presenting the results of this correlation analysis to the merchant or real estate provider at their request and/or optionally back to the loyalty incentive system.

DETAILED DESCRIPTION OF THE INVENTION

Figure 1:
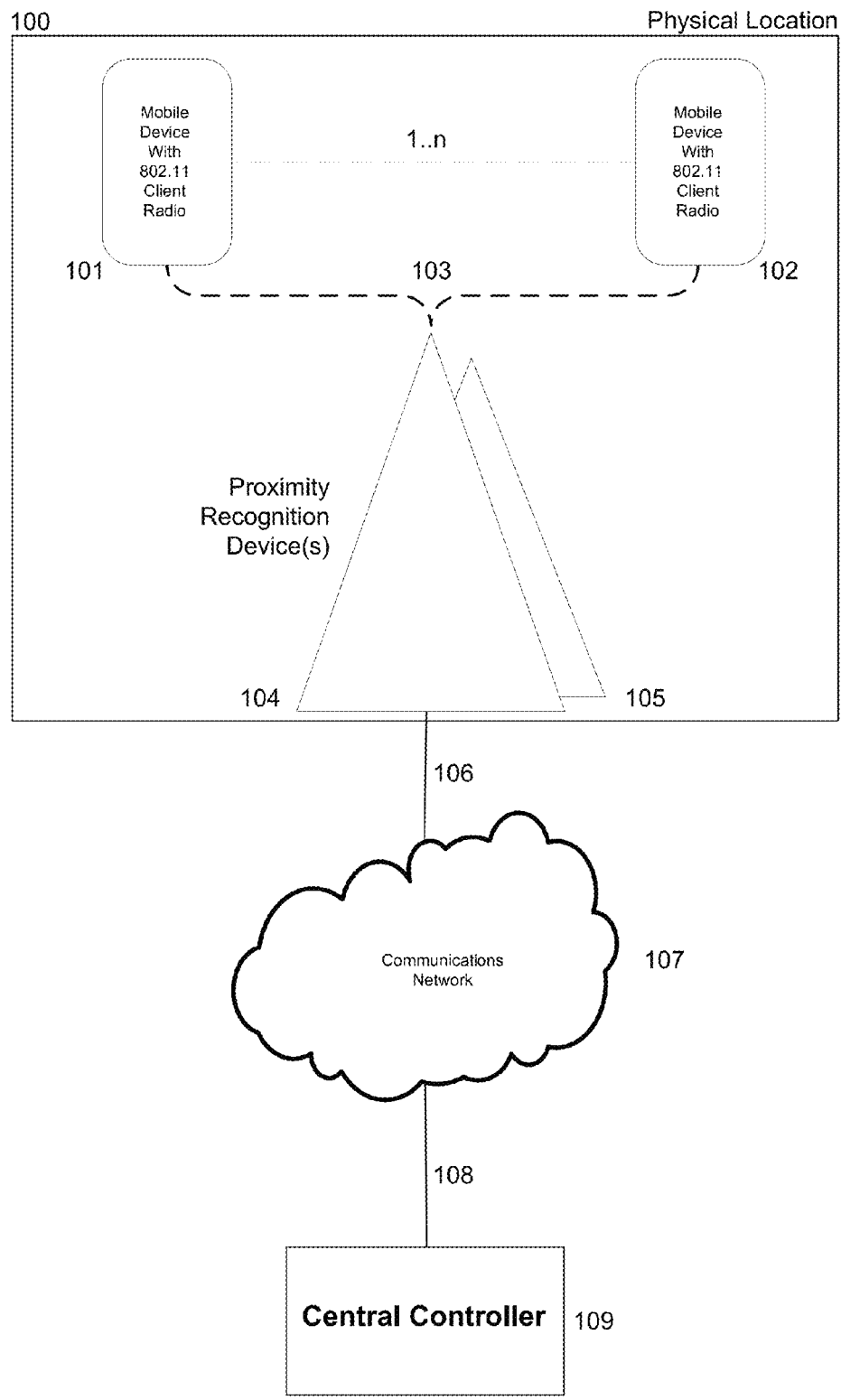
FIG. 1 illustrates the system architecture of the proximity recognition system (PRS).

In this section, the present invention is described in detail with regard to the drawing figures briefly described above.

For purposes of description the following terms have these meanings:

The terms "real estate provider", "venue owner", "venue operator", "real estate operator" and "real estate owner" unless otherwise specified below are used interchangeably to refer to the entity that owns and/or operates real estate space. Real estate providers in the context of the present invention are interested in one or both of the following objectives: understand behavior of visitors to their owned and/or operated space and enable merchants operating in the owned and/or operated space to understand behavior of visitors and potential customers.

The terms "venue", "premise", "space", "real estate", and "real estate premise" unless otherwise specified below are used interchangeably to refer to a specific physical space owned and/or operated by a real estate provider. Venues include malls, stores, shops, and theatres as well as other types of spaces including hotels, motels, inns, airports, dock facilities, arenas, hospitals, schools, colleges, universities, libraries, galleries, stations, parks, and stadiums. In alternate embodiments of the invention, space may include roadways on which vehicles operate.

The terms "WiFi", "Wifi", "WLAN", "Wireless Fidelity", and "wireless local area network" all refer to communications between mobile devices and infrastructure elements (commonly referred to as "access points" or APs). WLAN refers to devices and infrastructure using some variant of the 802.11 protocol defined by the Institute of Electrical and Electronics Engineers (IEEE) or some future derivation.

The terms "mobile device", "wireless device", "wireless local area enabled device", "WiFi mobile device" and "WLAN device" all refer to devices equipped to communicate over a wireless local area network in accordance with the 802.11 protocol, wherein the subject device initiates an association process with relevant infrastructure elements by undergoing the sequential phases of (1) scanning, (2) authentication (optional in some deployments) and (3) association. These phases involve the sending, receiving and processing of management frames. The scanning phase involves management frames related to probes and beacons, amongst others; the authentication phase involves authentication and de-authentication frames; and the association phase involves association request and association response frames.

The terms "merchant", "store", "outlet", and "retailer" unless otherwise specified below are used interchangeably to refer to any type of location that sells goods or services. A merchant may also own all or a portion of the space in which they operate.

The terms "customer", "buyer", and "consumer" unless otherwise specified below, are used interchangeably to refer to any party that visits a venue and who may initiate a purchase of a good or a service.

The terms "visitor", "guest, or "invitee" unless otherwise specified below, are used interchangeably to refer to any party that visits a venue which may or may not house merchants with whom a visitor could initiate a purchase of a good or service.

The above defined terms are used to describe the preferred embodiment of the present invention in reference to the attached drawing figures. Where appropriate, parts are referred to with reference numerals.

Referring to FIG. 1, the principal components used to implement the present invention are illustrated in a block diagram. A system and method is provided for proximity detection, recognition and classification of a wireless local area network (WLAN) enabled device without a WLAN infrastructure (APs). The proximity recognition system (PRS) monitors WLAN communications at one or more known locations depicted in FIG. 1 as 100. The proximity of a WLAN mobile device 101 or plurality of WLAN mobile devices 101, 102 is sensed by examining signal strength at a proximity recognition device PRD 104, 105 when the WLAN mobile device 101 initiates an association request for WLAN access. An identifier of the WLAN mobile device may be provided in the association request. Association requests may be periodic or may be prompted by a specific response from the proximity recognition device PRD 104 which may operate on one or a plurality of WLAN channels. Association requests may be sensed by one or a plurality of proximity recognition devices PRDs 104, 105. Information received by the proximity recognition devices PRDs is analyzed, summarized and sent via communications interface 106 comprising some combination of cable modems, DSL, DS1, DS3, SONET, Ethernet, fiber optic, WiMax, WiFi 802.11 or other wireless technology such as CDMA, GSM or long term evolution (LTE) or other future communications capability to a communications network 107 such as the Internet. Central Controller 109 of the proximity recognition system PRS is connected to the same communications network 107 via communications interface 108.

It should be appreciated that the present invention can be implemented in numerous ways, including as a process, a system, an apparatus, a device, a method, a computer readable storage medium containing computer program code, or as a computer program product comprising a computer usable medium having a computer readable program code embodied therein.

In the present context, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, solid state drives, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hard coded in hardware or take the form of software executing on a general purpose computer such that when the software is loaded into and/or executed by the computer, the computer becomes an apparatus for practicing the invention, or they are available via a web service. Applications may also be downloaded in whole or in part through the use of various development tools which enable the creation, implementation of the present invention. In this specification, these implementations, or any other form that the invention may take, may be referred to as techniques. In general, the order of the steps of disclosed processes may be altered within the scope of the invention.

Figure 2:
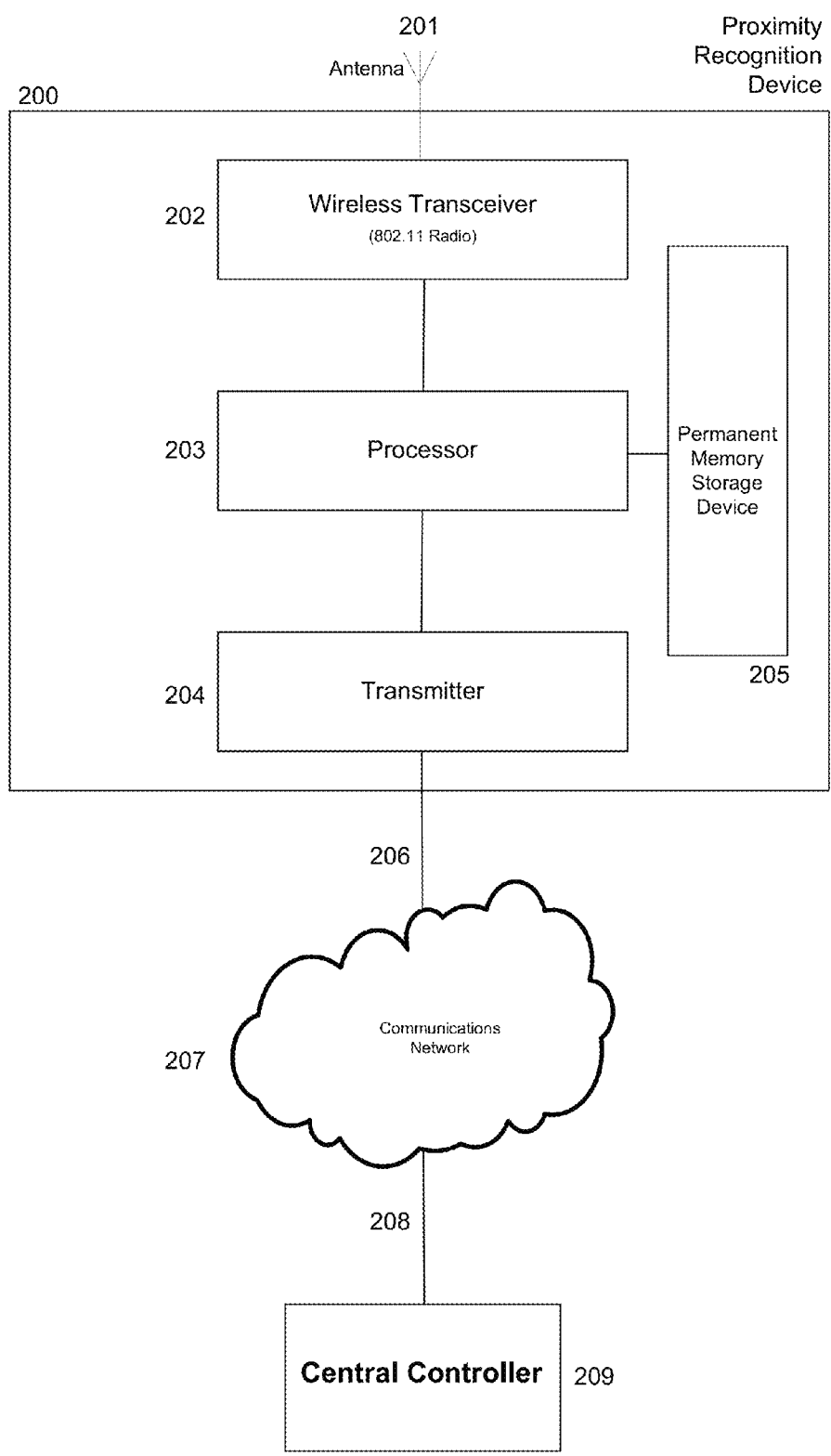
FIG. 2 is a functional block diagram of a proximity recognition device (PRD).

With reference to FIG. 2, a block diagram of a proximity recognition device (PRD) is presented.

PRD 200 has one or more a wireless antennas 201 for receiving signals from WLAN equipped mobile devices in the vicinity of PRD 200.

PRD 200 is equipped with a WLAN capable transceiver 202 for sending and receiving packets to and from mobile devices in the vicinity of the PRD 200.

PRD 200 is equipped with a transceiver 204 for sending and receiving information to the Central Controller 209. A wide variety of embodiments are possible. These include Ethernet, a separate WLAN radio, universal serial bus, or other wireless wide area wireless networking device using technology such as CDMA, GSM or long term evolution (LTE). Transceiver 204 connects to a communications network 207 such as the Internet over a wired or wireless communications interface 206.

PRD 200 is equipped with a permanent memory storage device 205 for storage of program instructions related to the operation of the proximity recognition system PRS. In various embodiments, this could include compact flash or similar memory devices.

PRD 200 processor 203 is configured to execute instructions stored in permanent memory device 205.

PRD 200 provides detection and recognition of wireless local area network (WLAN) enabled mobile devices in range of PRD 200 without a WLAN infrastructure. The ability to provide this capability is particularly important in venues that do not control WLAN infrastructure or do not wish to provide WLAN access for visitors for business reasons.

Proximity recognition device PRD 200 monitors WLAN communications at its known location determining the identifier of mobile devices in range within the venue during the mobile device's attempts to associate with a WLAN access point.

Proximity recognition device PRD 200 may optionally monitor multiple WLAN communications channels at its known location.

Based on a dynamically determined understanding of the WLAN infrastructure environment and WLAN infrastructure of interest to the mobile device 101, 1021 103, proximity recognition device PRD 200 may prompt an association request from the mobile device by sending to the mobile device a specifically formatted response. To improve the mobile device location inference, more interactions are prompted by PRD 200. The prompted association request is preceded by management frames in the scanning and authentication phases of the association sequence.

Specifically, PRD 200 provides for detection of a WLAN association request received via antenna component 201 and wireless transceiver 202, wherein the association request is associated with a request originating from mobile device 101, 102, 103 to gain access to a wireless local area network.

The proximity of a mobile device 101, 102, 103 is sensed by examining signal strength when the mobile device initiates a request for WLAN access.

A unique identifier of WLAN mobile device 101, 102, 103 may be provided in the association request. When provided, the unique identifier is provided to Central Controller 209 for further processing along with additional information such as PRD 200 identifier, signal strength and timestamp. Central Controller 209 is coupled via communications interface 206 to the same communications network 207 as PRD 200 via communications interface 208.

In one embodiment, PRD 200 can also use permanent memory device 205 to temporarily record information regarding observations of mobile device operation until confirmation is received from Central Controller 209 that the information has been received by the Central Controller 209.

Figure 3:
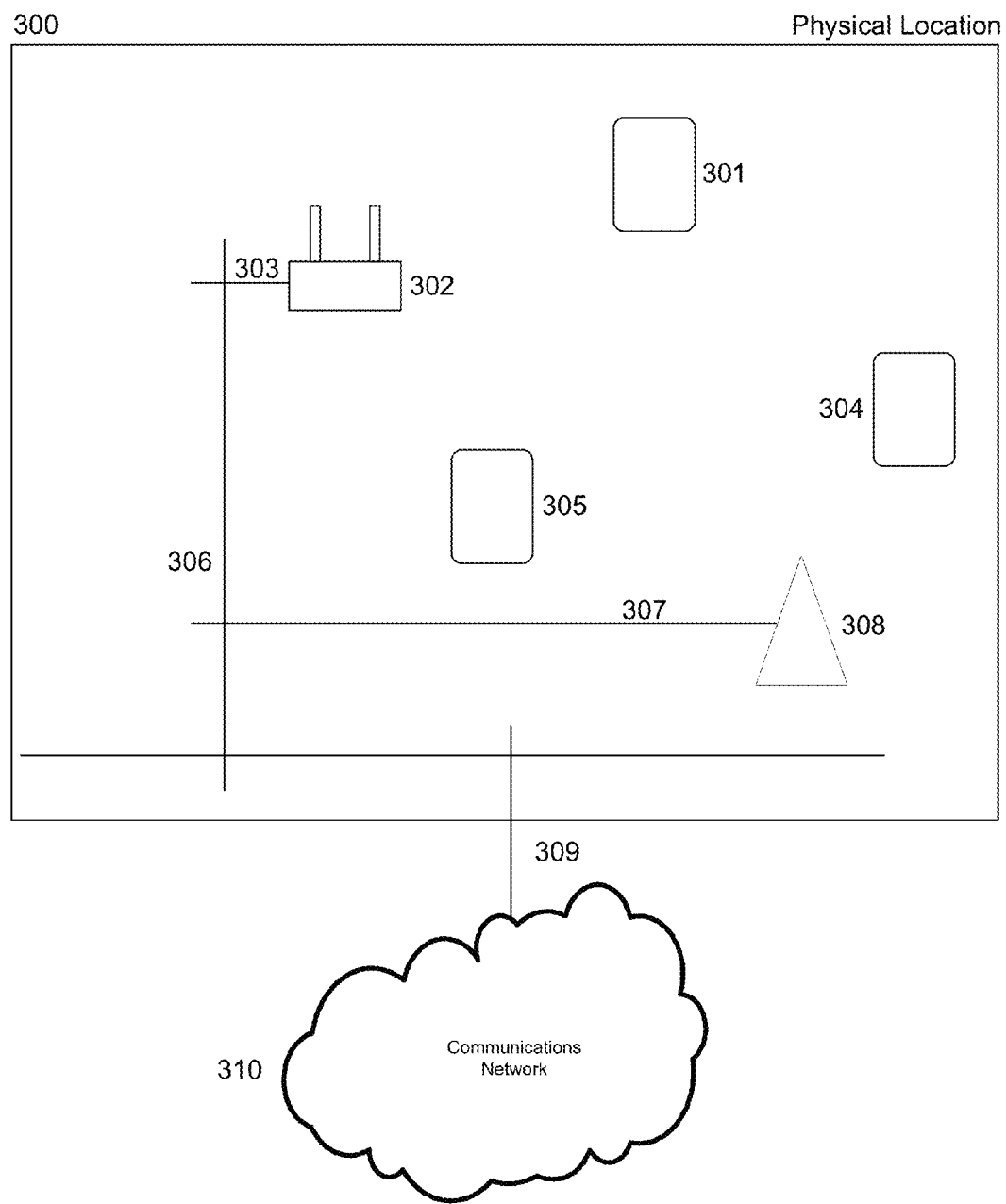
FIG. 3 illustrates communications between the mobile device, possible access points in the vicinity and a proximity recognition device (PRD).

With reference to FIG. 3, a block diagram of a typical venue environment into which a proximity recognition device (PRD) is deployed.

Within a typical deployment venue environment 300, PRDs 302, 308 may be connected to the venue's existing communications network 306. In various embodiments, PRDs 302, 308 may be connected to the venue's communications network 306 via some type of wired connection such as Ethernet 307 or wirelessly such as WLAN network 303 in venue 300. Venue's communication network 306 is attached by a communications interface such as DSL or cable modem 309 to wide area communications network 310 such as the Internet.

Within venue 300, a plurality of mobile devices 301, 304, 305 are expected to arrive and depart to and from venue 300 in a random nature. PRDs 302, 308 observes traffic from these mobile devices in its vicinity including their WLAN probe requests and WLAN association requests.

In the event a mobile device 301, 304, 305 associates with the venue's optional wireless local area network infrastructure (APs), the association request is observed by PRDs 302, 308 (including packets whose payload is encrypted using keys exchanged during the authentication phase of the association sequence).

In the event a mobile device 301, 304, 305 signals to request access to WLAN infrastructure that PRD 302, 308 has observed to not be in the vicinity, PRDs 302, 308 may prompt mobile device 301, 304, 305 to proceed with an association request by sending to mobile device 301, 304, 305, a specifically formatted protocol data unit (i.e. a management frame in the preceding scanning and authentication phases) using information supplied by mobile device 301, 304, 305.

In either of these cases, the resulting association request is observed by the PRD and where available the mobile device identifier and other optional parameters (such as signal strength) are recorded by the proximity recognition system PRS.

PRDs 302, 308 reports information regarding mobile device observations on an event or periodic basis to central controller (not shown) of the proximity recognition system PRS via communications network 310 which in this described embodiment is coupled to the venue's communications network 306 by a communications interface 309.

Figure 4:
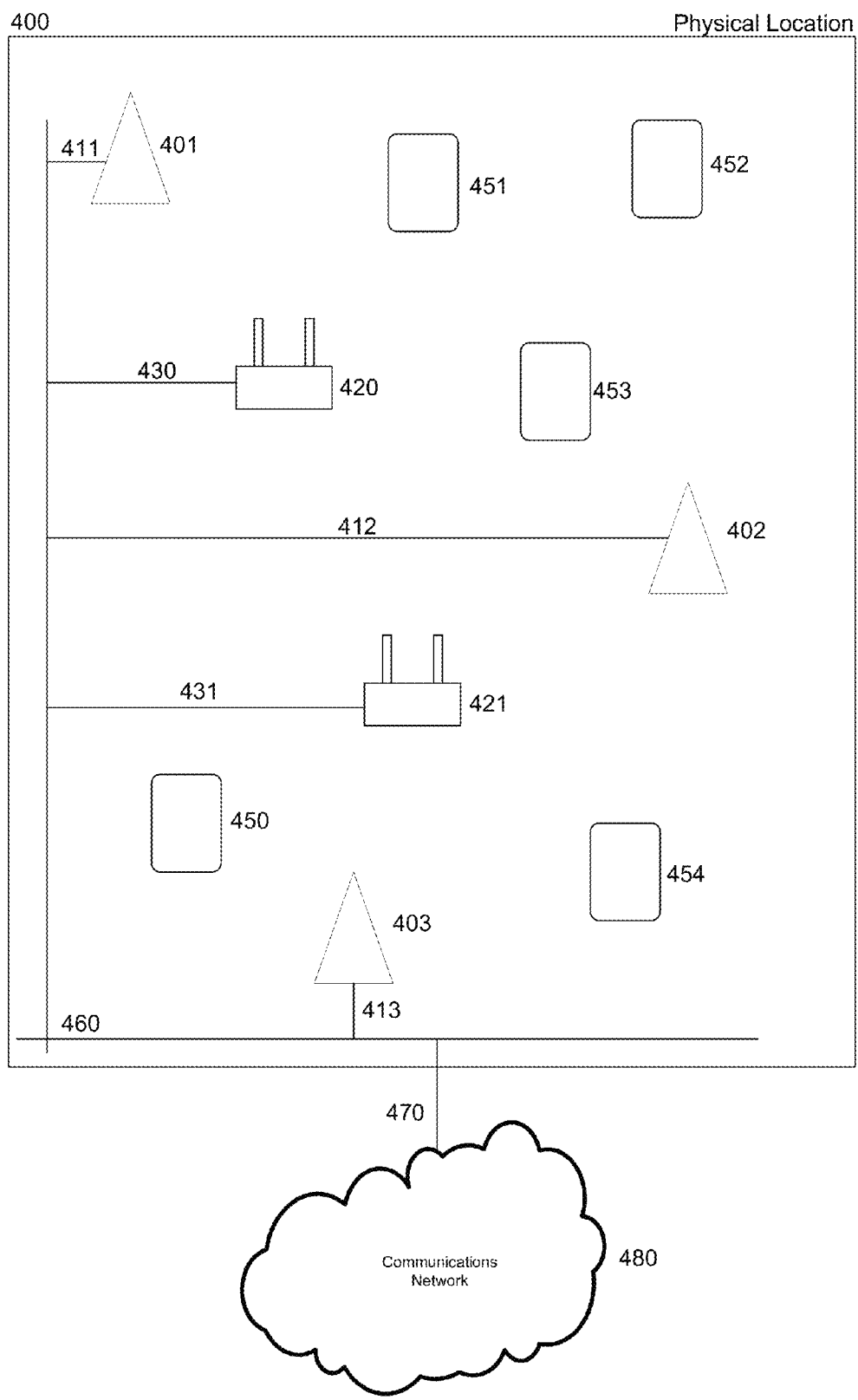
FIG. 4 illustrates communications between the mobile device, possible access points in the vicinity and plurality of proximity recognition devices (PRDs).

With reference to FIG. 4, a block diagram depicts a more complex typical example venue environment into which the proximity recognition system PRS may be deployed.

Within a typical deployment venue environment 400, a plurality of PRD devices 401, 402, 403, 420, 421 may be required. With reference to the specific embodiment example depicted in FIG. 4, PRDs 401, 402, 403, 420, 421 may be connected to the venue's existing communications network 460. In various embodiments, PRD may be connected to the venue's communications network 460 via some type of wired connection such as Ethernet 411, 412, 413 or wirelessly such as WLAN network 430, 431. Venue's communication network 460 is attached by a communications interface such as DSL or cable modem 470 to a wide area communications network 480 such as the Internet.

Within venue 400, a plurality of WLAN mobile devices 450, 451, 452, 453, 454 are expected to arrive and depart to and from venue 400 in a random nature. The PRD observes traffic from WLAN mobile devices in its vicinity including WLAN active probe requests and WLAN association requests.

In the event a mobile device is configured to associate with and proceeds to associate with the venue's optional wireless local area network infrastructure, the association request is observed by the all PRD 401, 402, 403, 420, 421 devices in range of the corresponding wireless transmission from the mobile device. For example, an association request from mobile device 452 may be received by PRDs 401, 402, 420, and 421 but not PRD 403.

In the event a mobile device 450, 451, 452, 453, 454 signals to request access to WLAN infrastructure that the PRD has observed to not be in the vicinity, one or more of PRDs 401, 402, 403, 420, 421 may prompt the mobile device to proceed toward association with a specifically formatted protocol data unit (PDU), being a management frame, using information supplied by the mobile device. Several embodiments of this network proximity technique are possible. One embodiment involves one or more of PRDs 401, 402, 403, 420, 421 sending a network beacon PDU formatted with the SSID of the network requested by mobile device 450, 451, 452, 453 or 454. In another embodiment, one or more of PRDs 401, 402, 403, 420, 421 send a probe response PDU formatted with the SSID of the network requested by the mobile device. In another embodiment, one or more of PRDs 401, 402, 403, 420, 421 send a disassociation PDU formatted with the SSID of the network requested by the mobile device. One or more embodiments may be combined to provide the proximity recognition system PRS with more packets than normal, from the mobile device to improve the overall accuracy of mobile device location inference. The prompted association request is preceded by management frame messages in the scanning and/or authentication phases of the association sequence. The resulting association request (and pre-association request messages) are observed by all PRD devices in range of the corresponding wireless transmission from the mobile device. For example, an association request from mobile device 450 may be received by PRDs 402, 403, 420, and 421 but not PRD 401.

In either of these cases, the resulting association request is observed by the set of PRDs 401, 402, 403, 420, 421 and where available the WLAN mobile device identifier and other optional parameters such as signal strength, are recorded by the proximity recognition system PRS.

Each of PRDs 401, 402, and 403, 420, 421 deployed in venue 400, in the example embodiment depicted in FIG. 4, report information regarding mobile device observations on an event or periodic basis to central controller (not shown) of the proximity recognition system PRS via communications network 480 which, in this described embodiment, is coupled to venue's communications network 460 by communications interface 470. Based on the movement of the WLAN mobile device 450, 451, 452, 453, 454 through the venue, each PRD deployed within venue 400 will gain and lose visibility to association and related re-association transmissions from mobile devices 450, 451, 452, 453, 454. Each PRD 401, 402, 403, 420, 421 reports its observations to central controller (not shown). Based on information from each of the PRDs deployed within venue 400, the central controller is able to infer movement through venue 400.

Figure 5:
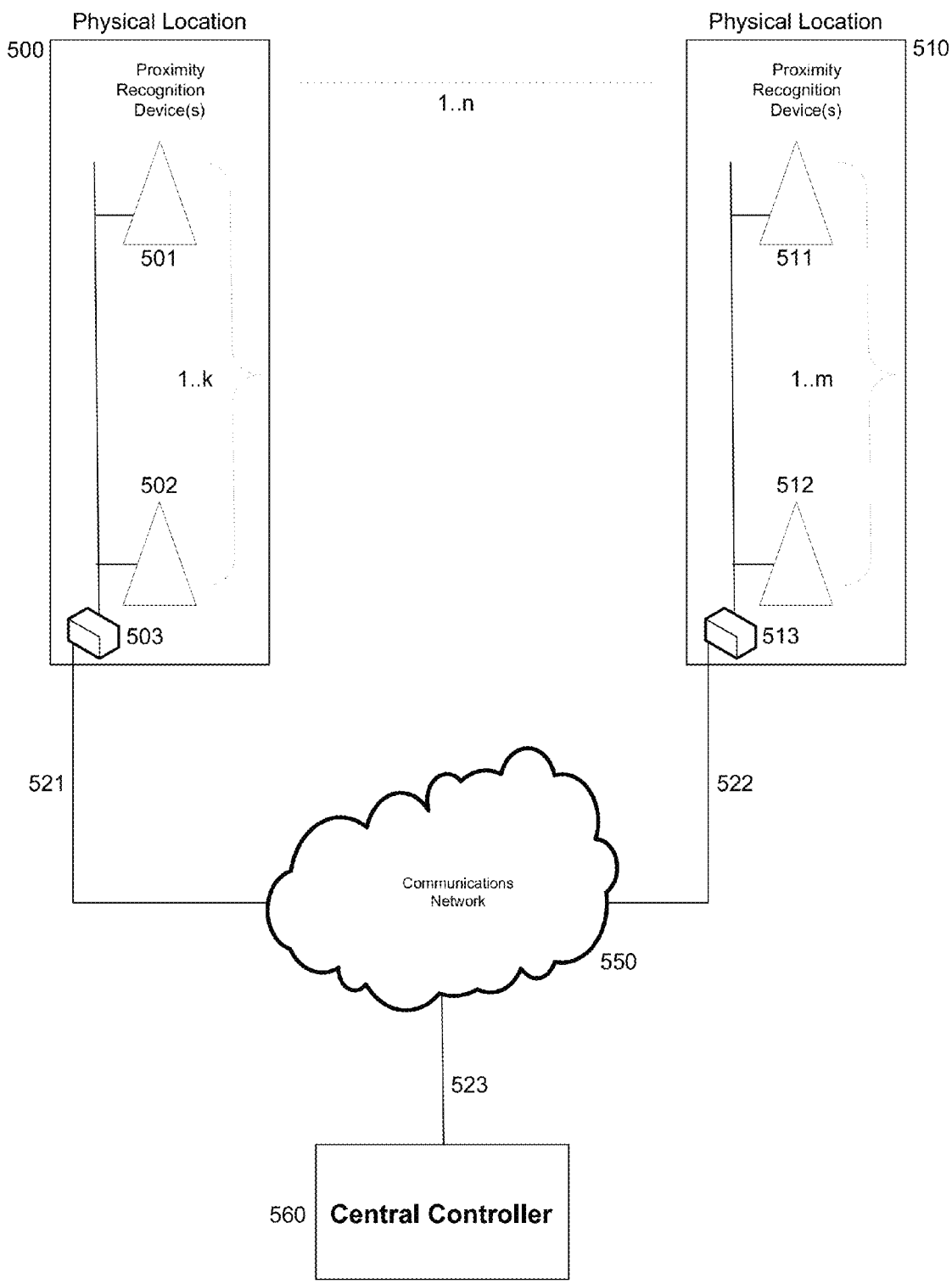
FIG. 5 is an architecture drawing of a distributed proximity recognition system (PRS) including PRD units and a central controller.

With reference to FIG. 5, a block diagram illustrating the multi venue architecture of the proximity recognition system PRS is presented.

Central Controller 560 is connected to one or more venues 500, 510 by communications network 550 through communications interface 523. Communications interface 523 comprises one or some combination of cable modems, DSL, DS1, DS3, SONET, Ethernet, fiber optic, or some other future wired connectivity as well as WiMax, WiFi 802.11, Long Term Evolution (LTE) or some other current or future wireless technology in a manner well known to those skilled in the area of communications technology.

With examplary venue 500, one or more proximity recognition devices PRDs 501, 502 are deployed in a manner designed to provide appropriate visibility of WLAN mobile devices within venue 500.

Proximity recognition devices PRDs 501, 502 within venue 500, as well as Proximity recognition devices PRDs 511 and 512 within venue 510 are connected to communications network 550 through communications interfaces 521 and 522 respectively, as previously described. In one embodiment, PRDs 501, 502, for example, may be coupled to the communications infrastructure of venue 500 and communicate to communications network 550 through the venue's primary and possible back up communications interfaces 521 through some communications gateway 503 (with communications interface 522 and communications gateway 513 performing corresponding functions for PRDs 511, 513 within venue 510).

Central Controller 560 of the proximity recognition system PRS receives information from each of the proximity recognition devices PRDs configured to send information to the Central Controller 560.

In various embodiments, each PRD can send information to one or a plurality of central controller instances 560 for redundancy or information partitioning reasons.

Figure 6:
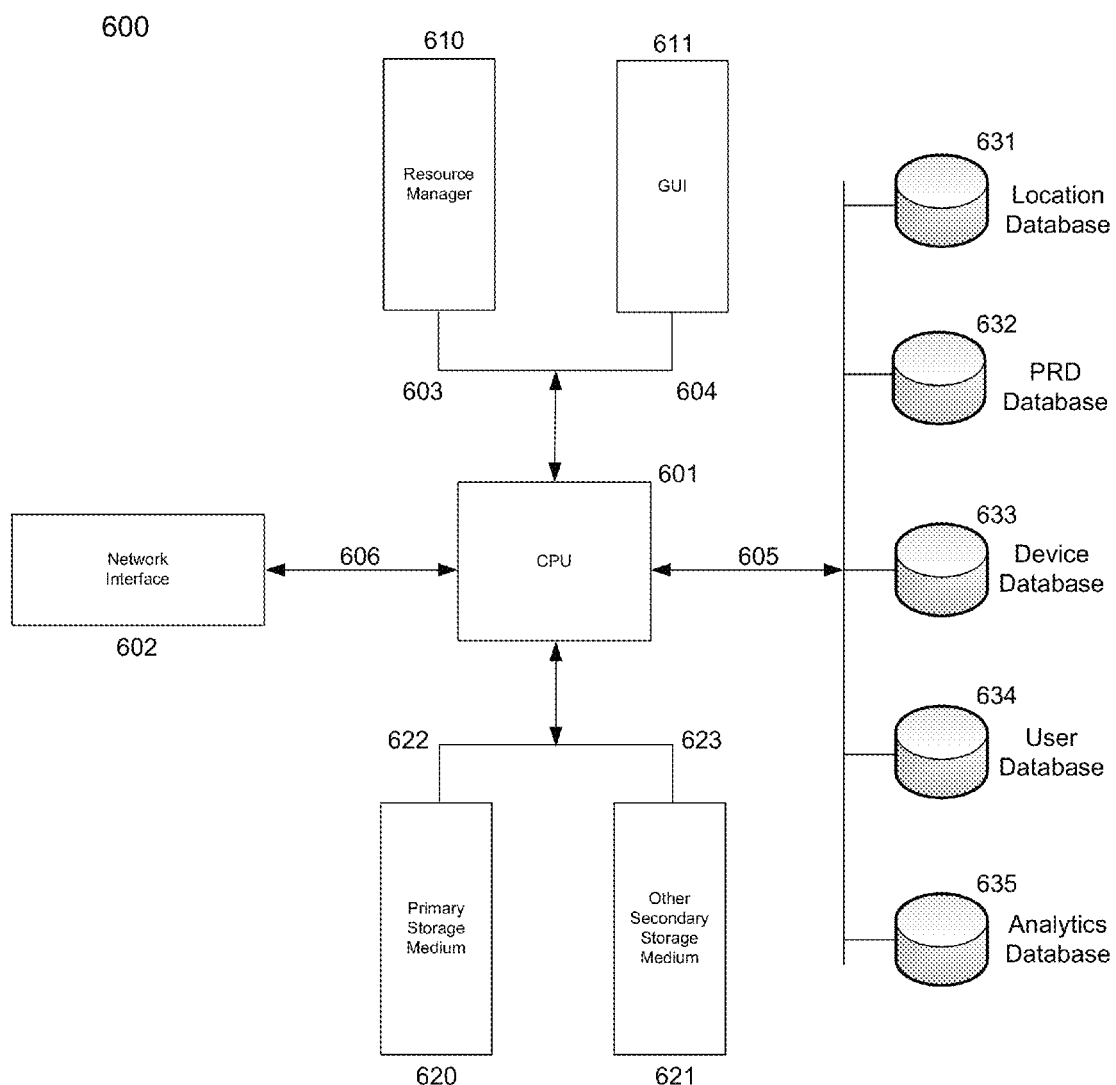
FIG. 6 is a block diagram of the central controller.

With reference to FIG. 6, the architecture of a typical embodiment of central controller 600 of the proximity recognition system is depicted in accordance with the definitions provided above.

Central controller 600 includes one or more central processing units (CPU) 601 to execute instructions which are delivered or installed electronically (software) to central controller 600 such as a server program to manage the operation of system. Primary storage mechanism 620 is coupled to CPU 601 by interface 622 and is used to temporarily store instructions as well as to input and output data. CPU or CPU complex 601 is also coupled by interface 623 to other secondary storage medium 621 which is used to store information permanently even when central controller 600 is not powered. Information can include instructions and relevant information such as operational state data as well as configuration parameters.

For the purposes of system administration including system activity and status review, capacity optimization, or system configuration among other functions, a graphic user interface (GUI) 611 of some form is optionally provided that connects with CPU 601 directly via local connectivity 604 or optionally via Network Interface 602. Optionally, Resource Manager 610 is connected to CPU 601 directly or via local connectivity 603 or optionally via Network Interface 602. Examplary Resource Manager 610 entities that are commercially available include Splunk Enterprise and Hewlett Packard's Network Management Center product.

CPU complex 601 is also coupled by interface 605 to databases used to persistently store information about the status of the proximity recognition system PRS overall. Database 631 stores information about the venues registered with central controller 600 including some optimal combination of their name, contact information, security credentials, street address, global address expressed in latitude and longitude and possible site specific information. Database 632 stores information about the proximity recognition devices (PRDs) known to central controller 600 including some optimal combination of their name, communications and/or IP address, assigned venue, previously assigned venues, contact information, security credentials, and possible bio metric information. Database 633 stores information about the mobile devices known to the instance of central controller 600 including some optimal combination of device identifier, venue appearance history as well as other possible device specific analytics information. Database 634 stores information about users registered with this instance of central controller 600 including name, user name, email address, company, venue access list, PRD access list, operational privilege list, account maintenance information, bio metrics information, audit trail and possible security credentials. Database 635 stores information about analytics information awarded including some optimal combination of their venue summarization, device summarization, time of day, week, or month summarization, other historical data summarization or other forms of analytical calculation, date, time, customer identifier, merchant identifier, third party beneficiary identifier, transaction identifier, and possible security credentials.

Databases 631, 632, 633, 634, and 635 and other Secondary Storage Medium 621 are connected and configured for optimal systems operation in a manner well known to those skilled in the area of information systems and database technology.

Central controller 600 and in particular CPU 601, is also coupled via interface 606 to communications Network Interface 602 to communications network 550 as in FIG. 5 in a manner well known to those skilled in the area of information systems and communications technology.

Figure 7:
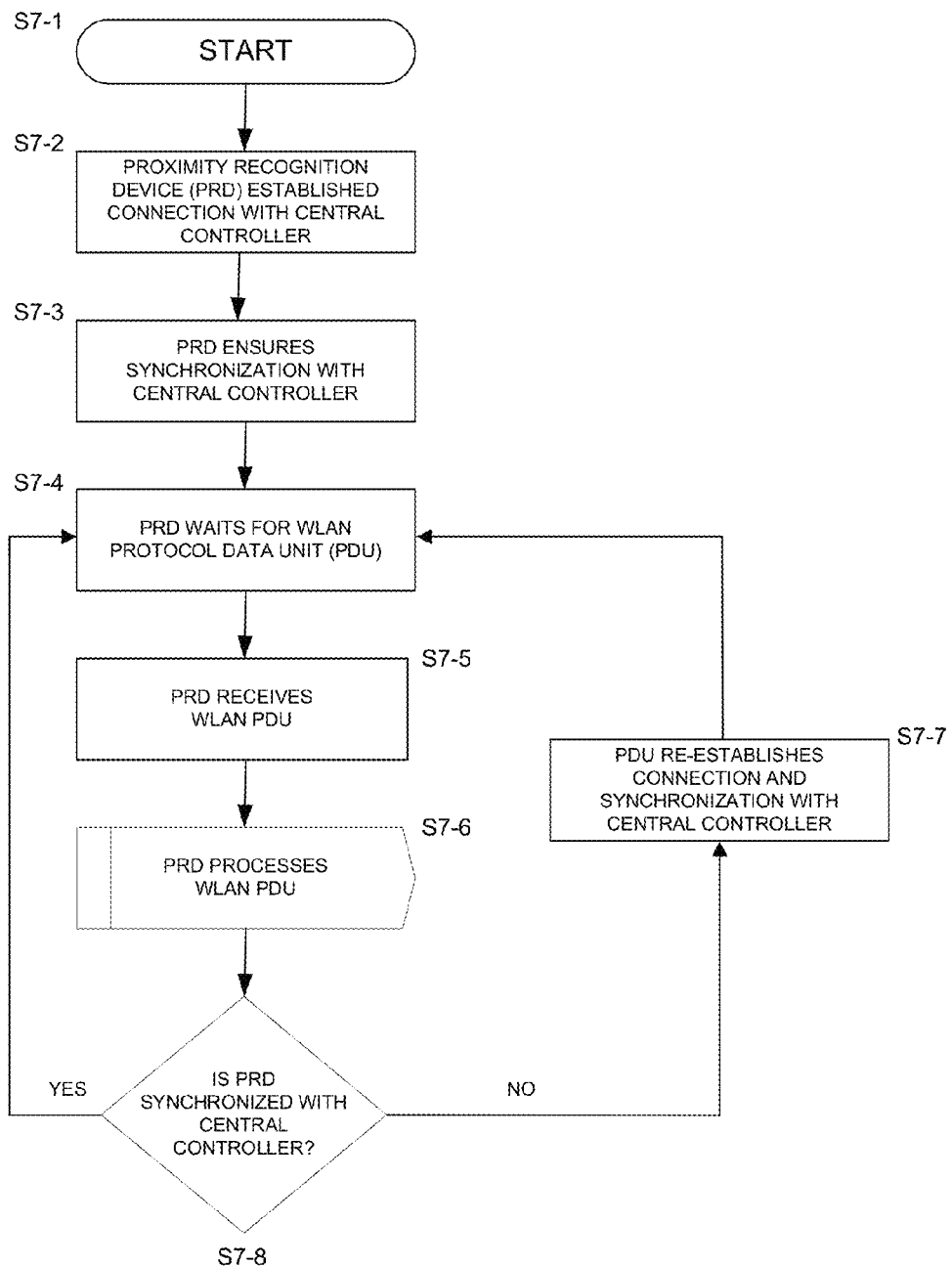
FIG. 7 is a logic diagram illustrating the process of a proximity recognition device (PRD) operating in the vicinity of an accessible access point (AP).

With reference to FIG. 7, a flowchart describing the steps performed by the proximity recognition device PRD upon system start is depicted. In various embodiments, the PRD starts and becomes fully operational when power is applied or when certain time parameters are met (such as time of day for example). Processing starts at step S7-1 and immediately proceeds to Step S7-2 in which the PRD establish a connection with Central Controller.

Once connectivity has been established with Central Controller certain information including time synchronization, is established at Step S7-3.

Proceeding to Step S7-4, the PRD waits to receive a WLAN protocol data unit (PDU) using antenna 201 and wireless transceiver 202 from WLAN mobile devices in the vicinity of the PRD.

When a PDU has been received at Step S7-5, the PRD proceeds to Step S7-6 in which the PDU is processed according to certain rules and instructions that have been delivered to the PRD. An example embodiment of PDU processing is described in FIG. 8.

After processing the received PDU, the PRD proceeds to Step S7-8 where the status of the PRD's synchronization with Central Controller is checked. If the PRD is synchronized with the Central Controller, it returns to Step S7-4 and waits for another PDU to arrive from mobile devices within range of the PRD's antenna 201 and wireless transceiver 202.

At Step S7-8, if the PRD determines it is not synchronized with the central controller, the PRD proceeds to Step S7-7 where the PRD attempts to re-establish connection and synchronization with Central Controller.

Figure 8:
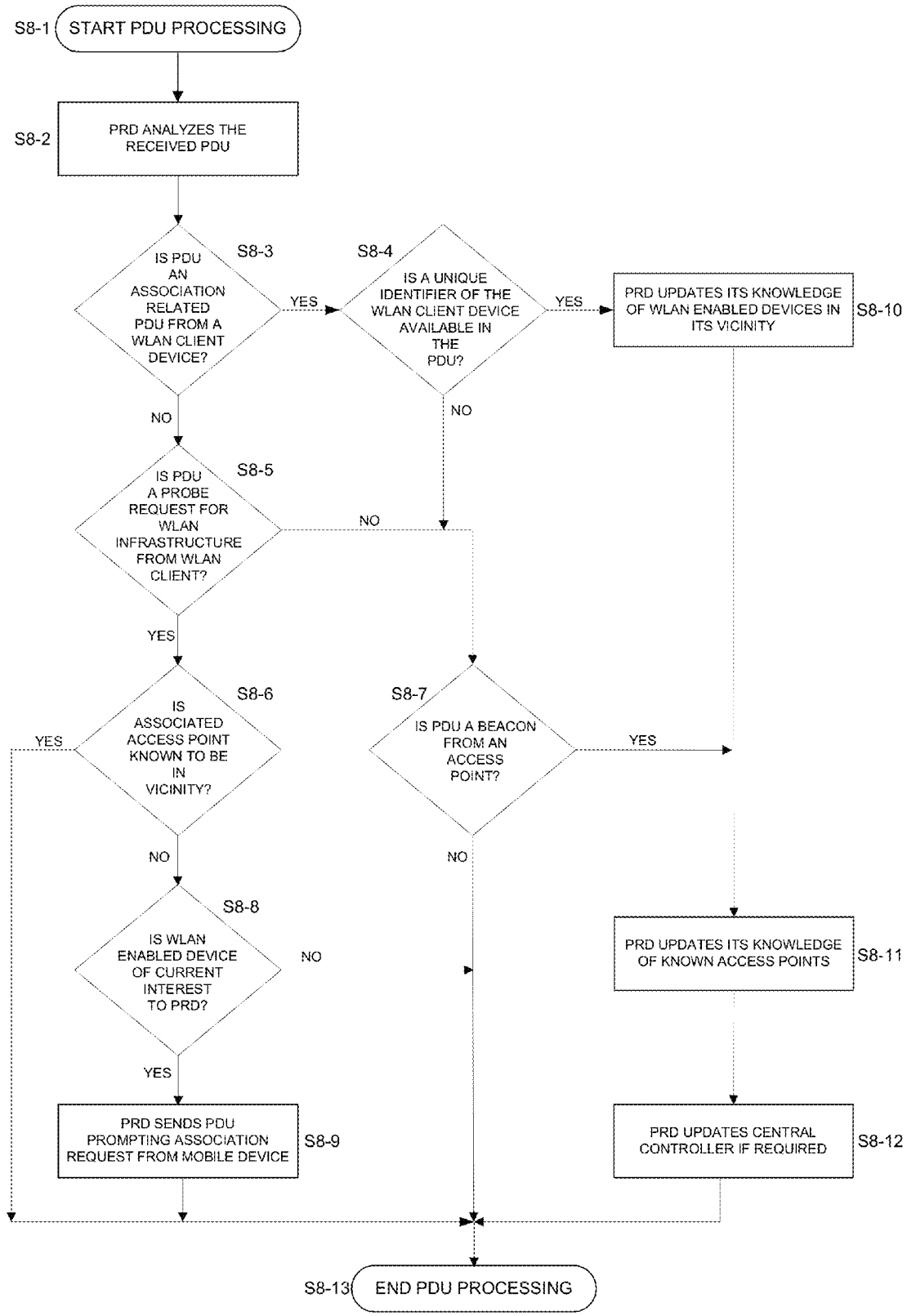
FIG. 8 is a logic diagram illustrating the process of a proximity recognition device (PRD) operating with no accessible access points (APs) in the vicinity.

With reference to FIG. 8, a flowchart describing the steps performed by the proximity recognition device (PRD) upon receipt of a protocol data unit (PDU) from a mobile device in the PRD's vicinity is depicted. Processing starts at S8-1 and immediately proceeds to S8-2 where the received PDU is analyzed.

Proceeding to Step S8-3, the PDU is examined to determine if the type of PDU is an association related PDU. If the PDU is association related, processing proceeds to Step S8-4, where the association related PDU is examined to determine if an identifier of the WLAN enabled client (which is typically a WLAN mobile device in the vicinity of the PRD) is available.

At Step S8-4, if the unique identifier for the WLAN mobile device is available, processing proceeds to Step S8-10 in which the PRD updates its knowledge of mobile device in its vicinity. This knowledge includes information such as WLAN mobile device identifier, observation time, signal strength, signal strength normalization information if available, and identifier of the access point AP to which the mobile device is requesting association.

Following Step S8-10, the PRD proceeds to step S8-11 where knowledge of access points APs known to be in the vicinity of the PRD is updated. This knowledge includes the unique identifier or MAC address of the access point AP to which the WLAN mobile device is requesting access, the assigned name of the access point AP, the related signal strength of the association, response time parameters and other possible unique elements of the access point AP or its response to the mobile device requesting association. If the unique identifier of the access point corresponds to the unique identifier of the PDU, the PDR also records this information.

Following Step S8-11, the PRD proceeds to step S8-12 in which the PRD determines if the Central Controller is required. If required, the PRD sends update information as described above to Central Controller. Forms of update vary widely based on embodiment. Variations include compression techniques as well as security techniques. Compression possibilities include various compression methods include the Lempel-Ziv (LZ) compression method. Security possibilities include Message-Digest Algorithm variants include MD4 and MD4, Advanced Encryption Standard (AES) as well as various forms of public/private key encryption methods.

Returning to Step S8-3, if the PDU is not association related, the PDU is the examined at Step S8-5 to determine if it is a probe request from a WLAN device.

If the PDU is determined to be a probe request from a WLAN device at Step S8-5, the PDU is then examined at Step S8-6 to determine if the WLAN device/enabled client is probing for a named WLAN access point AP (as may be identified by its service set identifier (SSID) or some other similar identifier) that is known to be in the vicinity of the PRD.

If the PRD determines that the WLAN access point from which the WLAN enabled client is requesting a response is not in the vicinity, processing proceeds to Step S8-8 where the PRD determines if the WLAN enabled client is of interest to the PRD. Interest varies widely based on embodiment. Parameters that may be used to determine interest level include determination of device type from the identifier of the WLAN mobile device, recent activity from the identified mobile device, information about other WLAN devices in the vicinity of the PRD as well as other possible factors.

If the PRD determines that the WLAN device (typically mobile device) is of interest, the PRD then sends at Step S8-9 a PDU to the WLAN device to request association.

Returning to Step S8-5, if the PDU is determined to not be a probe request from a WLAN enabled client, the PDU is then examined to determine at S8-7 if it is a beacon from an access point AP in the vicinity and, specifically, in range of the PRD. If this is the case, the PRD then updates its knowledge of access points APs in its vicinity and updates Central Controller if required as described above for Step S8-11 and Step S8-12.

Processing of the PDU is completed (S8-13) and the PRD waits for the next PDU to be received.

In view of the foregoing discussions pertaining to the flowchart illustrated in FIGS. 7 and 8, it is understood that such a system enables merchants and real estate operators to better understand the behavior of venue visitors, customers and potential customers equipped with WLAN enabled mobile devices in new ways not heretofore possible.

While this invention has been described in its preferred embodiment with reference to WiFi, the principles of this invention are easily applicable (by an average person skilled in the art) to other, short range communications protocols (including, but not limited to, Bluetooth (IEEE 802.15.1-2002/2005), Passive RFID, and Active RFID. The principle, that a device may be prompted into more communication than normal (by sending more management frames), is applicable in this broader scope of wireless technologies. Furthermore, the principle finds great applicability to a wireless technology where devices communicate using a unique identifier (UUID), thus allowing for the harvesting of more communication data points (e.g. more signal strength readings) for better granularity of proximity detection and recognition.

Accordingly, while this invention has been described with reference to the illustrative embodiments, this description is not intended to be construed in any limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A method for detecting in a venue, the proximity of a mobile device that is enabled, according to a communications protocol, to request access to a wireless local area network (WLAN) infrastructure element, comprising the steps of:

(a) monitoring wireless communications in the venue in accordance with the communications protocol;

(b) detecting first message from the mobile device that was sent as part of the communications protocol to request access to the WLAN infrastructure element, and reading from said first message, the identity of the requested WLAN infrastructure element;

(c) artificially provoking second message to be sent from the mobile device by sending a provocatively-formatted message to the mobile device without the use of WLAN infrastructure elements, the provocatively-formatted message being a message that is formatted with an identity of its source, to be said read identity of the requested WLAN infrastructure element of said first message, said second message counting as more than normal for the communications protocol as being provoked by said provocatively-formatted message that uses as its out-of-protocol source address, said read identity of the requested WLAN infrastructure element.

2. The method of claim 1, wherein said first message is a probe request.

3. The method of claim 2, wherein said provocatively-formatted message is the probe response message.

4. The method of claim 2, wherein said provocatively-formatted message is the disassociate-ion message.

5. The method of claim 2, wherein said provocatively-formatted message is the beacon message.

6. The method of claim 2, wherein said identity of the requested WLAN infrastructure element is its service set identifier (SSID).

7. The method of claim 1, further comprising the step of:
(d) detecting said second message from the mobile device and using said second message to generate additional information that is useful in detecting proximity of the mobile device.

8. A proximity detection device for detecting in a venue, the proximity of a mobile device that is enabled, according to a communications protocol, to request access to a WLAN infrastructure element organized under that protocol, that
   (a) monitors wireless communications in the venue in accordance with the communications protocol;
   (b) detects first message from the mobile device that was sent as part of the communications protocol to request access to the wireless local area network, and reads from said first message, the identity of the requested WLAN infrastructure element;
   (c) artificially provokes second message from the mobile device by sending a provocatively-formatted message to the mobile device without the use of WLAN infrastructure elements, the provocatively-formatted message being a message that is formatted with an identity of its source, to be said read identity of the requested WLAN infrastructure element of said first message, said second message counting as more than normal for the communications protocol as being provoked by said provocatively-formatted message that uses as its out-of-protocol source address, said read identity of the requested WLAN infrastructure element.

9. The device of claim 8, wherein said first message is a probe request.

10. The device of claim 9, wherein said provocatively-formatted message is the probe response message.

11. The device of claim 9, wherein said provocatively-formatted message is the disassociate-ion message.

12. The device of claim 9, wherein said provocatively-formatted message is the beacon message.

13. The device of claim 9, wherein said identity of the requested WLAN infrastructure element is its service set identifier (SSID).

14. The device of claim 8, wherein said PRD detects said second message from the mobile device and uses said second message to generate additional information that is useful in detecting proximity of the mobile device.

* * * * *